United States Patent
Korneev et al.

(10) Patent No.: US 11,571,740 B2
(45) Date of Patent: Feb. 7, 2023

(54) FABRICATED SHAPE ESTIMATION FOR ADDITIVE MANUFACTURING PROCESSES

(71) Applicant: Palo Alto Research Center Incorporated, Palo Alto, CA (US)

(72) Inventors: Svyatoslav Korneev, Stanford, CA (US); Vaidyanathan Thiagarajan, Palo Alto, CA (US); Saigopal Nelaturi, Mountain View, CA (US); Ziyan Wang, Stanford, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 165 days.

(21) Appl. No.: 16/821,458

(22) Filed: Mar. 17, 2020

(65) Prior Publication Data

US 2021/0291261 A1    Sep. 23, 2021

(51) Int. Cl.
| | |
|---|---|
| B33Y 50/02 | (2015.01) |
| B22D 23/00 | (2006.01) |
| B33Y 10/00 | (2015.01) |
| B33Y 30/00 | (2015.01) |
| G05B 19/4099 | (2006.01) |
| G06F 113/10 | (2020.01) |

(52) U.S. Cl.
CPC ............ *B22D 23/003* (2013.01); *B33Y 10/00* (2014.12); *B33Y 30/00* (2014.12); *B33Y 50/02* (2014.12); *G05B 19/4099* (2013.01); *G06F 2113/10* (2020.01)

(58) Field of Classification Search
None
See application file for complete search history.

(56) References Cited

U.S. PATENT DOCUMENTS

| | | | |
|---|---|---|---|
| 5,764,521 A * | 6/1998 | Batchelder | B29C 41/36 700/196 |
| 7,827,131 B2 | 11/2010 | Nugent | |
| 9,507,555 B2 | 11/2016 | Liu et al. | |
| 9,886,526 B2 * | 2/2018 | Huang | B29C 64/393 |
| 10,234,848 B2 | 3/2019 | Mehr et al. | |
| 10,434,573 B2 | 10/2019 | Buller et al. | |

(Continued)

FOREIGN PATENT DOCUMENTS

WO    2018/217903    11/2018

OTHER PUBLICATIONS

Lu et al. "A Layer-To-Layer Model and Feedback Control of Ink-Jet 3-D Printing", IEEE/ASME transactions on mechatronics, vol. 20, No. 3, Jun. 2015 (Year: 2015).*

(Continued)

*Primary Examiner* — Jason Lin
(74) *Attorney, Agent, or Firm* — Mueting Raasch Group

(57) ABSTRACT

A computer representation of a printable product part and a plan for the printable product part to be deposited using an additive manufacturing process are received. The printable product part comprises an accumulation of material deposited by the additive manufacturing process. The plan comprises a tool-path representation of the printable product part and process parameters. A plurality of as-printed shapes of the printable product part are determined after it has been deposited according to the plan. Geometric differences between any of the plurality of as-printed shapes with the computer representation of the product part are determined.

18 Claims, 19 Drawing Sheets

(56) References Cited

U.S. PATENT DOCUMENTS

| | | | |
|---|---|---|---|
| 11,150,633 | B2* | 10/2021 | de Souza Borges Ferreira ........... B33Y 50/02 |
| 2009/0228416 | A1 | 9/2009 | Nugent |
| 2015/0269282 | A1* | 9/2015 | Nelaturi .................. G06F 30/17 700/98 |
| 2015/0269290 | A1* | 9/2015 | Nelaturi .................. G06T 17/10 703/6 |
| 2016/0320771 | A1* | 11/2016 | Huang .................... B29C 67/00 |
| 2017/0011147 | A1* | 1/2017 | Kazama .................. G06F 30/20 |
| 2017/0239891 | A1* | 8/2017 | Buller .................... B28B 1/001 |
| 2017/0252821 | A1 | 9/2017 | Sachs et al. |
| 2017/0368753 | A1* | 12/2017 | Yang .................. G05B 19/4099 |
| 2018/0222110 | A1* | 8/2018 | Batchelder ............ B29C 64/106 |
| 2018/0341248 | A1* | 11/2018 | Mehr .................... G05B 13/048 |
| 2019/0007078 | A1 | 3/2019 | Higgs, III et al. |
| 2019/0029853 | A1 | 10/2019 | Kane |
| 2020/0223143 | A1* | 7/2020 | Gurdiel Gonzalez .. B22F 10/30 |
| 2021/0031507 | A1 | 2/2021 | Haik et al. |
| 2021/0141970 | A1* | 5/2021 | Xu ..................... G05B 19/4099 |

OTHER PUBLICATIONS

EP Search Report from EP Application No. 21175763.8 dated Oct. 21, 2021, 11 pages.

Korneev et al., "Fabricated Shape Estimation for Additive Manufacturing Processes with Uncertainty", Computer-Aided Design, vol. 127, May 21, 2020, 13 pages.

Lin et al., "Intelligent Modeling and Monitoring of Micro-Droplet Profiles in 3D Printing", ISA Transactions, May 2020, pp. 367-376.

Lu et al., "A Layer-To-Layer Model and Feedback Control of Ink-Jet 3-D Printing", IEEE Transactions on Mechatronics, vol. 20, No. 3, Jun. 1, 2015, pp. 1056-1068.

Shi et al., "Learning-Based Cell Injection Control for Precise Drop-on-Demand Cell Printing", Annals of Biomedical Engineering, vol. 46, No. 9, Jun. 5, 2018, pp. 1267-1279.

De Souza Borges Ferreira et al., "Automated Geometric Shape Deviation Modeling for Additive Manufacturing Systems via Bayesian Neural Networks", IEEE Transactions on Automation Science and Engineering, vol. 17, No. 2, Apr. 2020, pp. 584-598.

Wang et al., "In-situ droplet inspection and closed-loop control system using machine learning for liquid metal jet printing", Journal of Manufacturing Systems, vol. 47, Apr. 2018, pp. 83-92.

Zhu et al., "Machine learning in tolerancing for additive manufacturing", CIRP Annals, vol. 67, No. 1, May 2, 2018, pp. 157-160.

EP Search Report from EP Application No. 21160092.9 dated Aug. 16, 2021, 14 pages.

EP Search Report from EP Application No. 21175782.8 dated Oct. 29, 2021, 12 pages.

\* cited by examiner

FABRICATED SHAPE ESTIMATION FOR ADDITIVE MANUFACTURING PROCESSES

TECHNICAL FIELD

The present disclosure is directed to the design and manufacturing of mechanical parts.

BACKGROUND

Recent advances in additive manufacturing technologies have triggered the development of powerful design methodologies allowing designers to create highly complex functional parts.

SUMMARY

Embodiments described herein involve a method comprising receiving a computer representation of a printable product part and a plan for the printable product part to be deposited using an additive manufacturing process. The printable product part comprises an accumulation of material deposited by the additive manufacturing process. The plan comprises a tool-path representation of the printable product part and process parameters. A plurality of as-printed shapes of the printable product part are determined after it has been deposited according to the plan. Geometric differences between any of the plurality of as-printed shapes with the computer representation of the product part are determined.

A system involves a processor and a memory storing computer program instructions which when executed by the processor cause the processor to perform operations. The operations comprise receiving a computer representation of a printable product part and a plan for the printable product part to be deposited using an additive manufacturing process. The printable product part comprises an accumulation of material deposited by the additive manufacturing process. The plan comprises a tool-path representation of the printable product part and process parameters. A plurality of as-printed shapes of the printable product part are determined after it has been deposited according to the plan. Geometric differences between any of the plurality of as-printed shapes with the computer representation of the product part are determined.

Embodiments involve a non-transitory computer readable medium storing computer program instructions, the computer program instructions when executed by a processor cause the processor to perform operations. The operations comprise receiving a computer representation of a printable product part and a plan for the printable product part to be deposited using an additive manufacturing process. The printable product part comprises an accumulation of material deposited by the additive manufacturing process. The plan comprises a tool-path representation of the printable product part and process parameters. A plurality of as-printed shapes of the printable product part are determined after it has been deposited according to the plan. Geometric differences between any of the plurality of as-printed shapes with the computer representation of the product part are determined.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
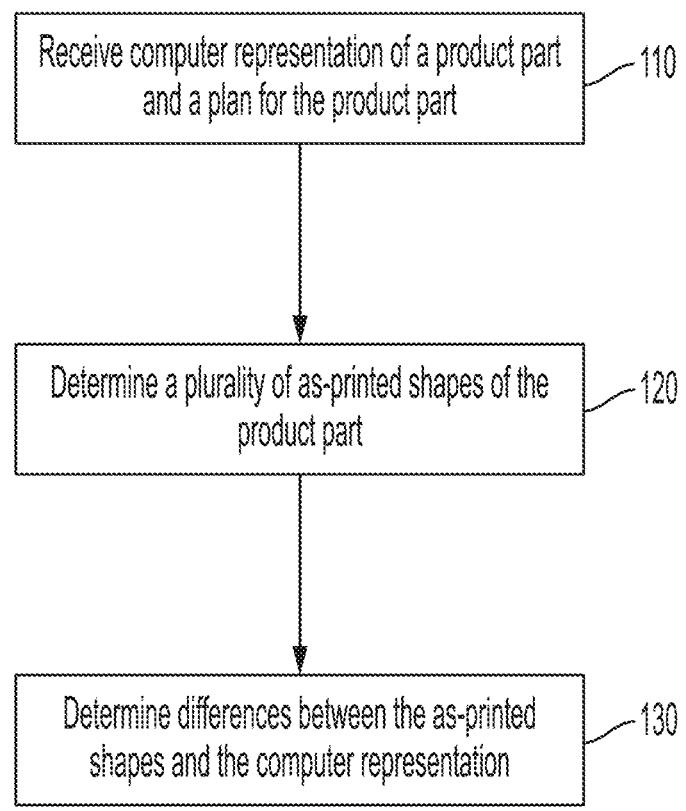
FIG. 1 shows a process for predicting the shape of an as-printed part in accordance with embodiments described herein.

The present disclosure relates to additive manufacturing (AM). Many such methods often operate under the assumption that any designed shape can be fabricated and the resulting part matches the designed shape with acceptable errors. In reality, however, the selected AM process, mechanical characteristics of the printer, or the material being used may introduce significant limitations to printability of a particular design within acceptable error. Effective shape modeling of as-printed part shape will help AM process planning by eliminating expensive trial-and-error due to multiple builds and converge quickly to parameter values that yield acceptable part quality.

Uncertainties in any manufacturing process lead to deviations between nominal designs and their fabricated counterparts. Nominally designed shape and material layout is invariably altered in an AM process, and shape variations can lead to undesirable effects such as (unintentional) porosity and surface roughness. These in turn can lead to long-term performance degradation due to residual stresses, fatigue failure mechanisms such as crack initiation and/or can negatively affect bulk mechanical properties. Metal parts designed for high stress applications may be fully dense with smooth surfaces to minimize the possibility of failure in service. While such properties are achievable in machining, the geometric complexity achievable using AM enables manufacturing functional high performance lightweight parts that may be difficult to fabricate otherwise. This feature of metal AM motivates the need to understand the relationship between a nominal design and its corresponding variational class of shapes arising due to the combination of chosen AM process parameters and manufacturing error. It is to be understood that while embodiments described herein are focused on select metal AM processes described herein can be used in conjunction with an AM process using any material. For example, the processes and systems described herein can be used with polymer AM.

For metal AM, microstructural details such as grain morphology, grain texture, and phase identification for Powder Bed Fusion and Direct Energy Deposition processes are studied using Light Optical Microscopy (LOM) and Scanning Electron Microscopy (SEM) microstructure imaging. The orientation of the columnar grains seen in these processes are highly influenced by a combination of the scan strategy and applied energy to induce material phase changes key to the AM process. Experimental analysis to map process parameters to particular manufacturing-driven structural and material variation is done in a case-by-case manner for each material and process combination in metal AM processes.

It is to be understood that that AM may not be a stand-alone process and may be followed by heat treatment to relieve residual stress and/or improve mechanical performance, and by machining to improve part surface quality and/or remove support materials. Applications involving post-processing may also need to plan the post-processing operations, such as support material removal using cutting tools and/or finishing rough part surfaces. Equipment manufacturers are concerned with geometric properties such as the minimum feature size/resolution, surface roughness, and/or accuracy to ensure the overall fabricated shape (excluding support materials) is as close as possible to the nominal design. Therefore, it may be useful to estimate the fabricated shape corresponding to a nominal design as a function of AM process parameters so that important properties such as porosity, roughness, and/or geometric deviation from a nominal design can be characterized before fabrication. Very little attention has been directed towards computational modeling and representation of as-manufactured part shape. Effective shape modeling of as-manufactured part shape will help AM process planning by eliminating expensive trial-and-error due to multiple builds.

Embodiments described herein involve using one or more models to estimate the the fabricated shape, also called the as-printed part, at different length scales. The shape and structure of material accumulated at the length scale of material deposition (typically ten to a few hundred microns) contributes to the overall shape of the as-printed part. However, it may not always be required to model the detailed shape at the length scale of material accumulation to represent the as-printed part. In some configurations a model uses a neural network to predict the state of the accumulated material and the substrate after material is added on the substrate. After the deposition, the state of the deposited and accumulated material adds to the state of the substrate. For the next deposition event the total state of the previously accumulated material and the substrate is considered as the state of the substrate. In other words, deposition changes the state of the substrate. The state of the part comprises a plurality of states of deposited material along a tool-path. The variables describing the physical state of the accumulated material and the substrate may include but are not limited to the spatial distribution of solid and liquid phases, the spatial distribution of temperature, the pressure, and the flow velocity. The shape of the part comprises a spatial distribution of the solid phase of the part.

According to various embodiments the first model is a high-fidelity physics model of the single deposition event. To model a part built, one may have to call the solver at every point along the tool-path. The solver calculates the state of the deposited and accumulated material and/or the substrate after the deposition event. The high-fidelity solver receives as an input the initial state of the minimum printable feature and the substrate integrates in time through the deposition and outputs the final state of the minimum printable feature and the substrate. The high-fidelity solver will be a very accurate solution, but the accuracy comes at a high computational cost. For example, simulation of the deposition at a single location (using such models) can take more than an hour on a high-end modern desktop computer. For droplet-based additive manufacturing, the deposition material at a location corresponds to a metal droplet that solidifies upon contact with the substrate.

Using the multi-physics solver involves satisfying certain numerical constraints during the integration process to solve the (partial) differential equations governing the physics of material accumulation. The constraints come from the mathematical formulation of the multi-physics solver. If these constraints are not satisfied, the solver may render instabilities resulting in the division on zero or the integration step becoming effectively zero. In this situation, the solver may not converge to the solution. However, the neural network as the surrogate model may not involve time integration and may therefore be orders of magnitude faster than the multiphysics model. The surrogate model may also not be restricted by the constraints unless they are explicitly encoded. The surrogate model inputs the initial state of the distribution of liquid and solid phases and the substrate and directly outputs the state of distribution and the substrate after the deposition. The neural network for the surrogate model is trained using one or more training sets. Once the network is trained (which is a one-time effort), the prediction boils down to a set of basic linear algebra operations which can be performed very efficiently via parallelization (on CPU and/or GPU cores). Thus, a trained network can make calculations very quickly. According to various embodiments described herein, the training data set can be obtained via a combination of a high-fidelity model (for example, thereto-fluidic multiphase flow simulation), a simplified model (for example, the steady-state shape of a liquid droplet) and/or actual experiments. If the training data is obtained via a computational model, the model may involve calibration with the experiment before the data collection. The calibration can be done by matching the output of the model with the experiment.

While droplet-based additive manufacturing is described herein, it is to be understood that the techniques described can be applied to any type of additive manufacturing process. The state of the output and the substrate are described by the spatial distribution of solid phase, liquid phase, and temperature. The trained neural network receives a spatial distribution of solid, liquid phases, and the temperature before the deposition and output spatial distribution of solid, liquid phases, and the temperature after the deposition. The execution time of this network on a desktop takes approximately 0.005 seconds. The error in the accuracy of the prediction is less than 10 percent compared to the high-fidelity solution. The high-fidelity multi-physics solver execution time for the same deposition is 20 minutes. Given a tool-path to fabricate the part, and the parameters to estimate the local material accumulation using the neural network, the neural network is repeatedly invoked at positions along the tool path to estimate the shape of the accumulated material over the entire manufacturing plan. This approach explicitly models the fabricated shape at multiple length scales (microns to meters). The resulting shape will be a high resolution representation of the as-printed part.

The second model uses a convolutional neural network to directly estimate the as-printed shape at the part length scale without explicitly modeling the material accumulation at the deposition length scale. It inputs the tool-path representation of the part and outputs the spatial distribution of the probability of local material accumulation. The printing process is always uncertain. Two as-printed shapes of the same part are never the same event for the same tool-path and the process parameters. The uncertainty comes from the uncertainty presented in the process. It can be mechanical or electrical noise, random external disturbance, variability in the material, just to mention a few. The uncertainty in the process translates into uncertainty in the shape of the as-printed part. The convolutional network captures this uncertainty in a computationally efficient fashion. Alternative efficient implementations of this operation can use GPU accelerated algorithms to compute convolutions using Fast Fourier Transforms.

FIG. 1 shows a process for predicting the shape of an as-printed part in accordance with embodiments described herein. A computer representation of a printable product part and a plan for the printable product part to be deposited using an additive manufacturing process are received 110. According to various implementations, the printable product part comprises an accumulation of material deposited by the additive manufacturing process. While the embodiments described herein are applicable to any type of additive manufacturing process, in some cases, the additive manufacturing process comprises a plurality of liquid metal droplets that coalesce and solidify according to the plan. The plan may comprise a tool-path representation of the printable product part.

A plurality of as-printed shapes of the printable product part after it has been deposited according to the plan is determined 120. According to various embodiments, the plurality of as-printed shapes are determined based on at least one physical state of one or both of the at least one deposited material and the substrate. The physical state may comprise one or more of a spatial distribution of solid and liquid phases of the material, a spatial distribution of temperature, a pressure, and a flow velocity, for example.

According to various embodiments, each of the plurality of as-printed shapes comprises a spatial distribution of a solid phase of the as-printed shapes.

Geometric differences between any of the plurality of as-printed shapes with the computer representation of the product part are determined 130. In some cases, the Boolean difference between the computer representation of the product part and any or all of the as-printed shapes of the product part is calculated. The geometric differences may be displayed on a user interface.

In some cases, a manufacturing error from the plurality of as-printed shapes of the product part are determined based on a statistical analysis. According to various embodiments, training data is generated using one or more of synthetically generated data and experimental data. A model may be built to determine manufacturing uncertainty of the product part based on the training data. The manufacturing uncertainty of the product part is determined based on the model.

According to various embodiments described herein, receiving the plan for the printable product part comprises receiving at least one model determining the material accumulation at successive steps of the plan. The at least one model may include one or more of a multi-physics model, a surrogate model of the multi-physics model, a machine learning model as a surrogate for the multi-physics model, and a reduced order model as a surrogate for the multi-physics model.

Embodiments described herein uses classical ideas of predictive estimation with uncertainty quantification. Uncertainty in the manufacturing process is quantified using simulated data obtained by modeling the physics of the material deposition and accumulation. The method also works with data obtained by scanning fabricated parts. First, a simulated data set of simple shapes is generated for a fixed set of process parameters, where N is the number of data points in the set, and each data point $D=\{\{T_1, P_1\}, 1=1, \ldots N\}$ is a pair of 3D arrays corresponding to the tool-path and its mapping to a spatial distribution of the probability. The tool-path T is a sampled indicator function, and the array P represents the spatial distribution of local material accumulation probability ($p \in [0; 1]$ for every $p \in P$). To generate the set, the Monte-Carlo approach is used by modeling multiple AM build processes of the same part while introducing uncertainty in the tool-path. For the simulation, a machine-learning-based surrogate model is developed that has accuracy comparable to a detailed multi-physics simulation of the build (1) process, but a low computational cost in comparison. The computational cost of a single deposition event using the high fidelity solver is not feasible for large-scale Monte-Carlo simulations. The surrogate model allows generating a large enough training set. A model order reduction is performed using a feedforward neural network with physics informed loss and activation functions. The spatial probability distribution is then modeled as a convolution of a kernel, K with the tool-path as shown in (1).

$$P = T \otimes K \quad (2)$$

Here, $\otimes$ is a discrete convolution. The kernel is estimated by training a convolutional neural network with a single convolutional layer. The boundedness of the output of the network is enforced by applying the clip activation function after the convolution. The trained weights of the convolutional layer represent the solution to (1). The inverse problem is ill-conditioned and may involve regularization; most machine learning frameworks have built-in regularization methods. Convolution of the kernel with a tool-path combined with an appropriate sub-level-set of the resulting field provides a computationally efficient way to estimate the as-manufactured shape of AM parts with the given probability. While simple shapes are used to estimate the kernel, the predicted geometry is validated on more complex shapes.

Figure 2A:
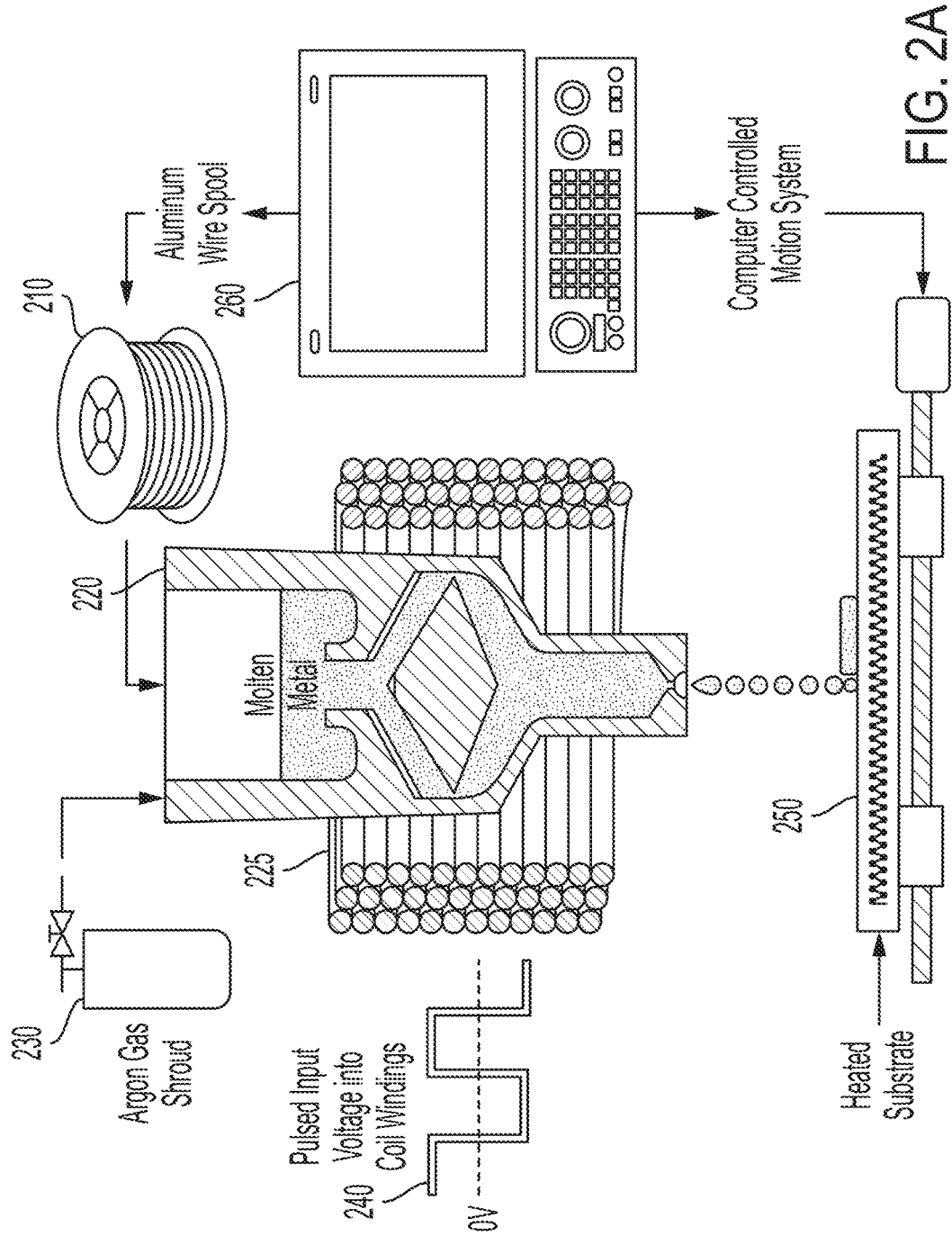
FIG. 2A shows an example drop-on-demand magnetohydrodynamic (MHD) deposition system in accordance with embodiments described herein.
Figure 2B:
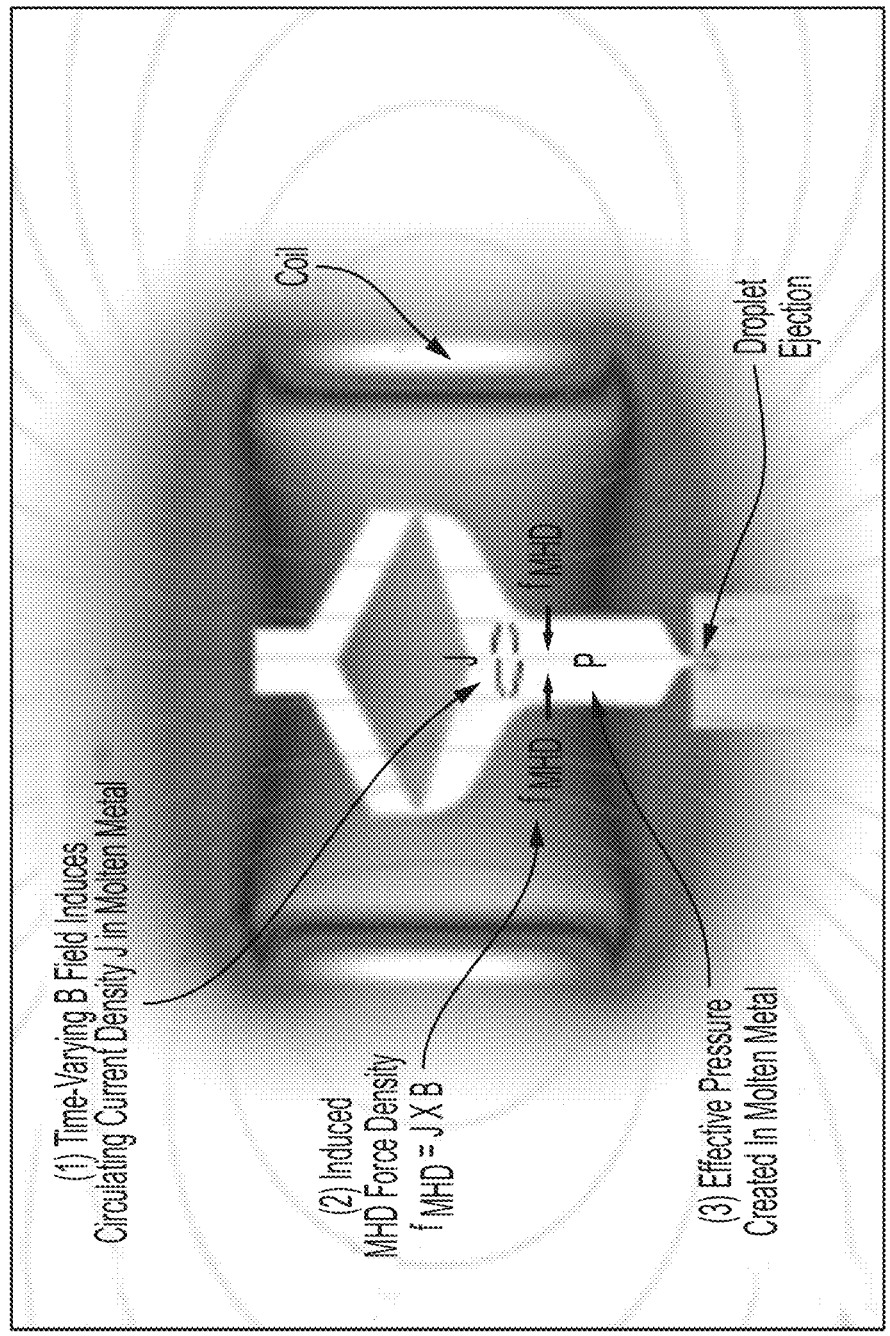
FIG. 2B shows a simulation model showing the magnetic field generated by the pulsed magnetic coil as well as the volume fraction of ejected liquid aluminum in accordance with embodiments described herein.

Embodiments described herein may use a drop-on-demand magnetohydrodynamic (MHD) deposition system shown in FIG. 2A. It is to be understood that other types of printing processes and/or systems may be used. In the MHD method, a spooled solid metal wire (e.g., aluminum wire) 210 and a gas 230 is fed continuously into a ceramic heating chamber 220 of a magnetohydrodynamic printhead and resistively melted to form a reservoir of liquid metal that feeds an ejection chamber via a capillary force. A coil 225 at least partially surrounds the ejection chamber and is electrically pulsed 240 to produce a transient magnetic field that permeates the liquid metal and induces a closed loop transient electric field within it. The electric field gives rise to a circulating current density that back-couples to the transient magnetic field and creates a magnetohydrodynamic Lorentz force density within the chamber. The radial component of this force creates a pressure that acts to eject a liquid metal droplet out of the nozzle orifice. Ejected droplets travel to a substrate 250 where they coalesce and solidify to form extended solid structures. Three-dimensional structures are printed layer-by-layer using a moving substrate 250 controlled by a controller that enables precise pattern deposition. The process is controlled by controller 260. FIG. 2B shows a simulation model showing the magnetic field generated by the pulsed magnetic coil as well as the volume fraction of ejected liquid aluminum.

Figure 3:
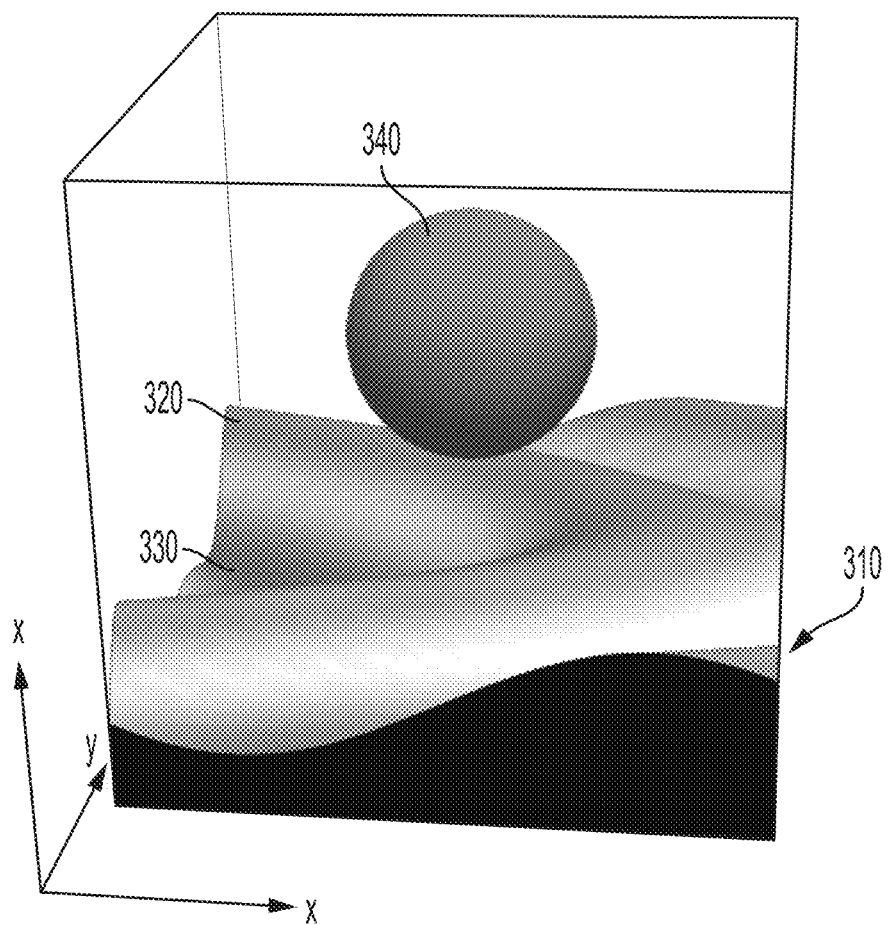
FIG. 3 shows a hot liquid droplet of spherical shape falling on the substrate of arbitrary shape in accordance with embodiments described herein.

For the high-fidelity model, the process of the droplet-based AM may be modeled as a series of localized single droplet events. A hot liquid droplet of spherical shape 340 falling on the substrate 320 of arbitrary shape is shown in FIG. 3. According to embodiments described herein, the substrate surface temperature is spatially uniform and the substrate is, on average, substantially solid. At least a portion of the substrate may be in a liquid state. A large fraction of liquid in the substrate may violate the localization assumption. Therefore, it may be assumed that the amount of liquid phase in the substrate is much smaller than the amount of solid phase. After hitting the substrate, the droplet bottom coalesces with the substrate surface. These assumptions can be made in a controlled range of process parameters. The droplet solidification front starts propagating from the bottom of the droplet, where the temperature is comparatively cold. During the solidification, the top part of the droplet may bounce several times before it eventually forms a steady-state shape. The droplet may also remelt the underlying substrate solid phase. It may be assumed that remelting is a highly localized event. The residual stress may potentially cause warping in the final geometry. It may be assumed that the temperature difference between the liquid droplet and the substrate is not significant enough to produce accountable warping. Elimination of the residual stresses allows modeling the droplet-based AM using a coupled system of equations for viscous flow and the heat transfer, where the solidification is accounted for by the momentum loss term in the momentum conservation equation. The momentum loss term effectively freezes the liquid when the temperature falls below the melting point.

A system of incompressible Navier stokes equations for multiphase flows is considered as shown in (2).

$$\nabla \cdot u = 0, \qquad (2)$$

$$\frac{\partial (\rho_k \alpha_k u)}{\partial t} + (\rho_k \alpha_k u \cdot \nabla)u = -\nabla p + \nabla \cdot (\mu_k \alpha_k \nabla u) + \rho_k \alpha_k g + F^D + F^T$$

Here, the first equation corresponds to the mass conservation equation, the second equation to momentum conservation equation, subscript k corresponds to the phase index (with summation assumed on k as per the repeated index notation), u is a flow velocity vector, $\rho$ is the fluid density, $\alpha$ is the phase fraction function, p is the pressure, $\mu$ is the dynamic viscosity, g is the gravitational constant, $F^D$ is Darcy's term which controls the fluid momentum during the phase change and $F^T$ is a surface tension force. Three phases are considered: k={gas; solid; liquid} and one phase transition solid $\leftrightarrow$ liquid. The sum of all phase fractions is equal to one, $\Sigma_k \alpha_k = 1$. According to various embodiments, the function $\alpha$ is discontinuous, and $\nabla \alpha$ may be considered in the sense of distribution or in the weak formulation. The surface tension may be only considered between liquid and gas phases. The surface tension force, $F^T$, is proportional to the mean curvature of the interface as shown in (3).

$$F^T = \sigma \kappa \nabla \alpha_{liquid} \qquad (3)$$

Here, $\sigma$ is the surface tension and $\kappa$ is the mean curvature. The Darcy's term is an artificial momentum sink term which immobilizes the fluid when the phase is solid. Any well-behaved function which satisfies the constraint shown in (4) will be suitable as a model of the momentum sink.

$$\alpha_{liquid}=1, \alpha_{solid}=0, F^D=0$$

$$\alpha_{liquid}=0, \alpha_{solid}=1, F^D \infty \qquad (4)$$

Here, Darcy's term is chosen as shown in (5).

$$F^D = -C \frac{\alpha_s^2}{(1-\alpha_s)^2 + \epsilon} u \qquad (5)$$

Here, C is a relatively large number and $\epsilon \ll 1$ is a relatively small number. The system of equations describing the conservation of the mass and momentum of the fluid is supported by the equation describing the conservation of the mass fraction as shown in (6).

$$\frac{\partial \alpha_k}{\partial t} + u \cdot \nabla \alpha_k - S_k = 0 \qquad (6)$$

Here, S is a term representing generation/loss of the mass fraction due to the phase change. For example, when liquid is solidified, S is negative for the liquid phase and positive for the solid phase. A model of S as a function of the temperature is shown in (7).

$$S_l = -S_s = \begin{cases} -C_{Lee} \alpha_l \frac{T_l - T}{T_l} & \text{if } T < T_s, \\ C_{Lee} \left( \alpha_l \frac{T - T_s}{T_s} - \alpha_l \frac{T_l - T}{T_l} \right) & \text{if } T_s < T < T_l, \\ C_{Lee} \alpha_s \frac{T - T_s}{T_s} & \text{if } T > T_l \end{cases} \qquad (7)$$

Here, $C_{Lee}$ is the model constant representing solidification time scale, Ts is the solidus temperature and L is the liquidus temperature. Finally, system of the equations is closed with the energy conservation equation shown in (8).

$$\frac{\partial h}{\partial t} + u \cdot \nabla h = \nabla \cdot (k \nabla T) \qquad (8)$$

Here, k is the heat conductivity coefficient; T is the temperature, and h is the enthalpy per unit volume:

$$h = \sum_k \alpha_k \int c_{p,k}(T) T dT + \alpha_l L \qquad (9)$$

Here $c_{p,k}(T)$ is the specific heat capacity of phase k at constant pressure and L is the latent heat associated with the phase change.

All the physical parameters of the model may be associated with the physical parameters of a given alloy. These can be measured from a direct experiment, for example. Nevertheless, two parameters may only be able to be identified by the indirect comparison of simulation results with the experiment. A high-speed camera may be used to measure a time series of the droplet solidification on the flat surface. By matching the droplet shape at any given time step, the numerical coefficient in Darcy's term, C, and the $C_{Lee}$ constant can be identified. The system of multiphase flow equations can be solved by employing the finite-volume method for spatial discretization and the volume of fluid method for interface tracking. The spatial resolution of the computational domain is approximately 16~μm. The initial condition for the simulations is a droplet above the surface. The initial droplet is constituted of a pure liquid phase and the initial substrate of a pure solid phase. The numerical simulations of a single droplet solidifying on a flat substrate are shown in FIGS. 4A-4D shows the comparison of the simulation result with the experiment for different times in the solidification process.

Figure 4A:
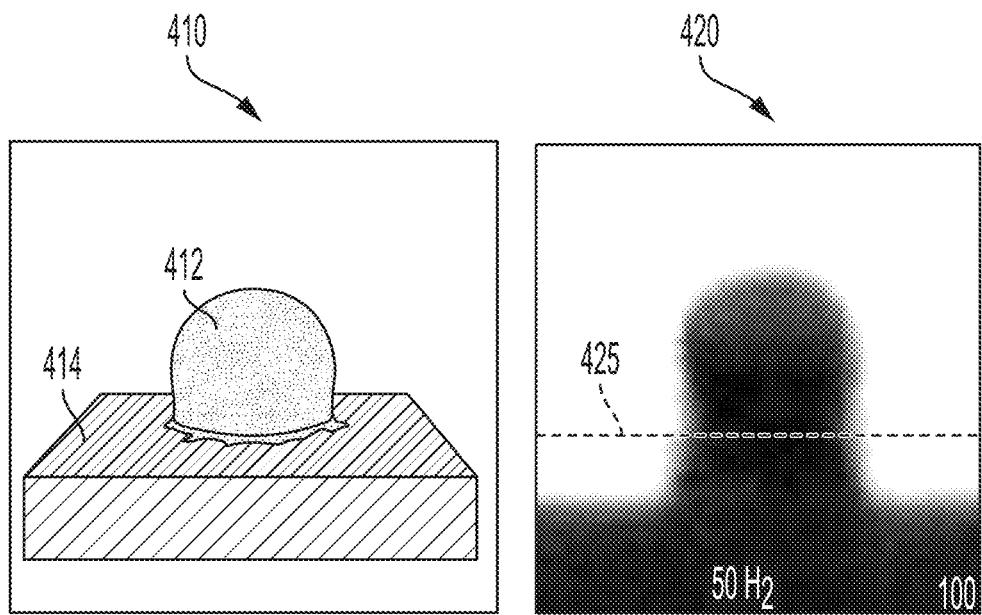
FIGS. 4A-4D illustrate simulation results and experimental results at different times of the solidification process in accordance with embodiments described herein.
Figure 4B:
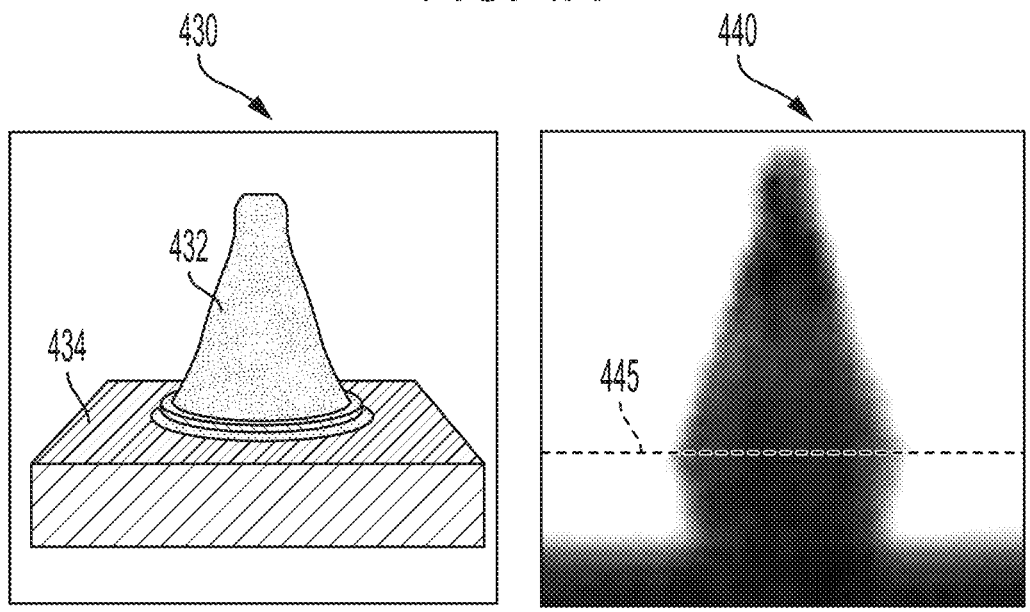
Figure 4C:
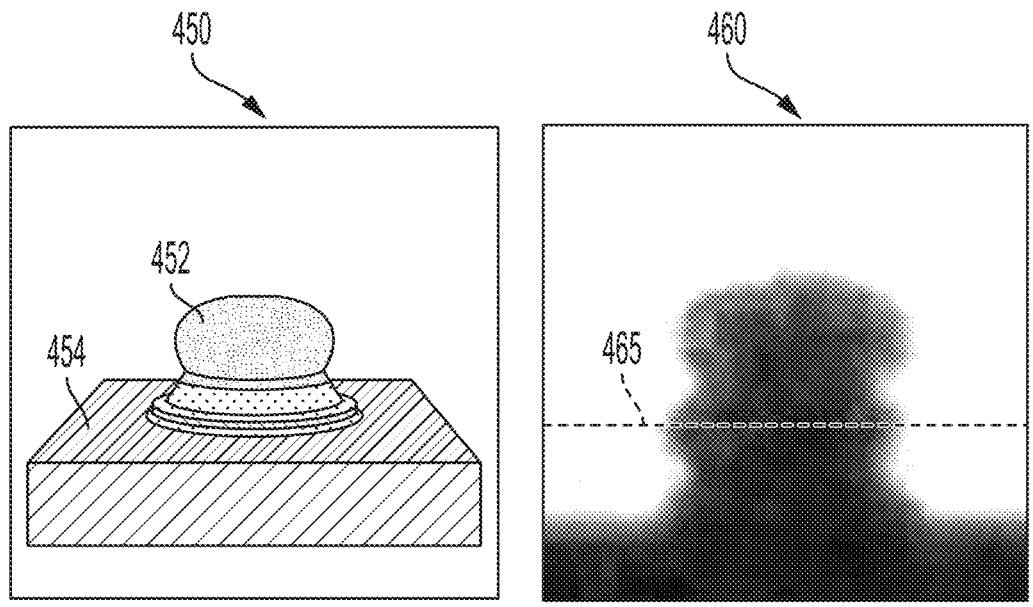
Figure 4D:
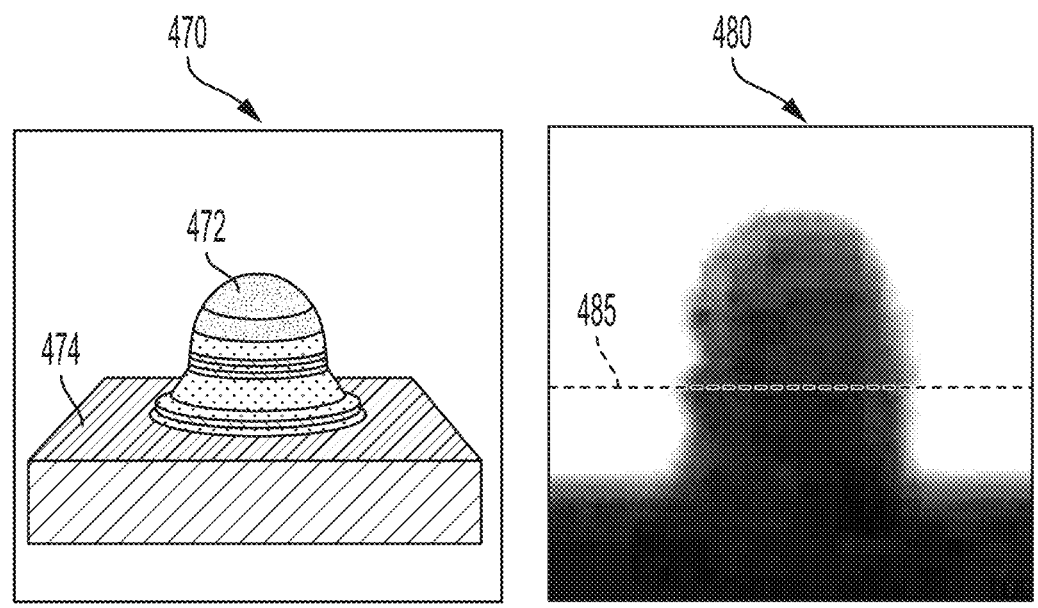

FIG. 4A illustrates the simulation results 410 and the experimental results 420 at t=0 ms. As can be observed, the liquid droplet 412 has made contact with the substrate 414. In the experimental results 420, the result below the line 425 is a reflection so is disregarded. FIG. 4B illustrates the simulation results 430 and the experimental results 440 at t=0.3 ms. As can be observed, the liquid droplet 432 has made contact with the substrate 434 and is starting to solidify at the interface between the droplet 432 and the substrate 434. In the experimental results 440, the result below the line 445 is a reflection so is disregarded. FIG. 4C illustrates the simulation results 450 and the experimental results 460 at t=0.9 ms. More of the droplet 452 has solidified at the interface between the droplet 452 and the substrate 454 when compared to the previous results. In the experimental results 460, the result below the line 465 is a reflection so is disregarded. FIG. 4D shows the simulation results 470 and the experimental results 480 at t=2.7 ms. At the timestamp shown in FIG. 4D, most of the droplet 472 has solidified on the substrate 474. In the experimental results 480, the result below the line 485 is a reflection so is disregarded. The close correspondence of simulated and observed droplet coalescence shows the multi-physics model accurately captures the shape of the solidifying droplet and the time scale of the solidification.

As described herein, prediction of the as-printed part shape using the multi-physics model involves the solution of a highly non-linear time-dependent system of partial differential equations capturing complex physics. For example, droplet-based additive manufacturing involves a numerical solution of multiphase flow and heat transfer in three dimensions. Solving such a complex system of equations on a high-end modern-day desktop computer is computationally expensive. For instance, simulating the deposition of a single droplet using a high-fidelity model may involve approximately an hour of computer time. To simulate the building of a part, one may use millions (or even billions) of droplets. Hence, to deal with such complexity, embodiments described herein involve an efficient reduced-order surrogate model for estimation of as-printed shape using machine learning. This reduced-order model has the advantage of decreasing the computational time for simulating droplet deposition. Using this highly efficient reduced-order model enables estimation of the shape of the printed part in minutes. According to various embodiments described herein, the two models are combined into one model, where the as-printed part shape is initially estimated using the surrogate model, and certain parts of the geometry are resolved using the multi-physics model. Furthermore, using the multi-physics solver may involve satisfying certain numerical constraints during the integration process. The constraints come from the mathematical formulation of the physics solver. If these constraints are not satisfied, the solver may render instabilities resulting in the division on zero, or the integration step became effectively zero. In this situation, the solver will not converge to the solution.

Figure 5A:
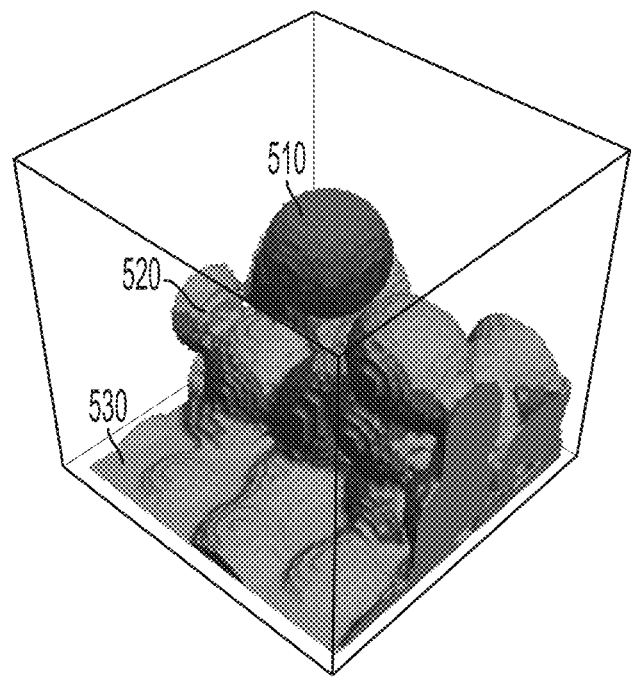
FIGS. 5A and 5B show examples of the training set in accordance with embodiments described herein.
Figure 5B:
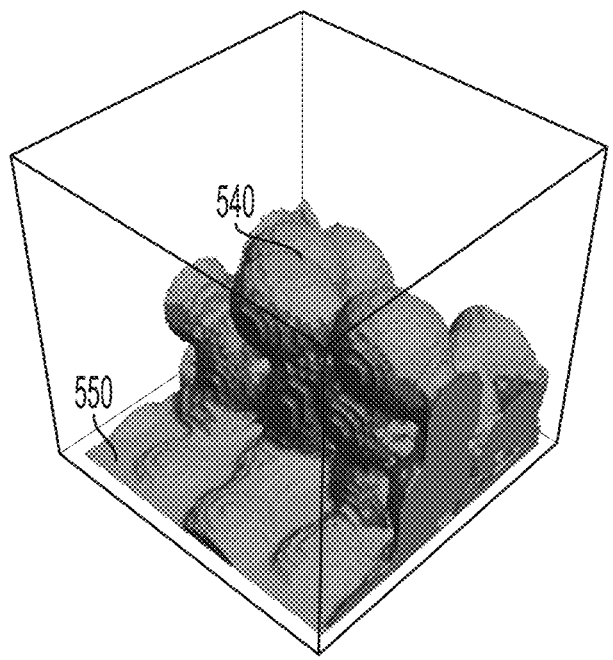

For the surrogate model, given a large and representative enough training set, a deep neural network is capable of interpolating multidimensional data. A deep neural network may be trained to predict the shape of a deposited droplet after every Δt=0.01 s, for example. The time step Δt may correspond to a deposition frequency of 100 Hz. First, a training set is generated by depositing droplets on various surfaces. An example of the training set is shown in FIGS. 5A and 5B. FIG. 5A shows the input at t=0 s. A liquid droplet 510 is being deposited on a substrate 530. Solid phase droplets 520 have already been deposited on the substrate 530 and solidified. FIG. 5B illustrates the distribution of solid and liquid phases at t=0.01 s. As can be observed, the deposited liquid droplet 510 from FIG. 5A is now in solid phase 540 on the substrate 550.

As described herein, the multi-physics solver outputs the simulated spatial distribution of the solid, liquid, and gas phases, and the spatial distribution of the temperature, pressure, and/or flow velocity. To reduce the size of input to the neural network, the spatial distribution of solid and liquid phases is combined with the temperature as a field $\alpha = T(\alpha_{solid} - \alpha_{liquid})$. The neural network is trained using a set $S = \{\{\alpha^i_{solid}, \alpha^i_{liquid}\}, i=1, \ldots, N_{set}\}$, where superscript corresponds to the pair index and $N_{set}$ is the total number of pairs in the set.

Figure 6A:
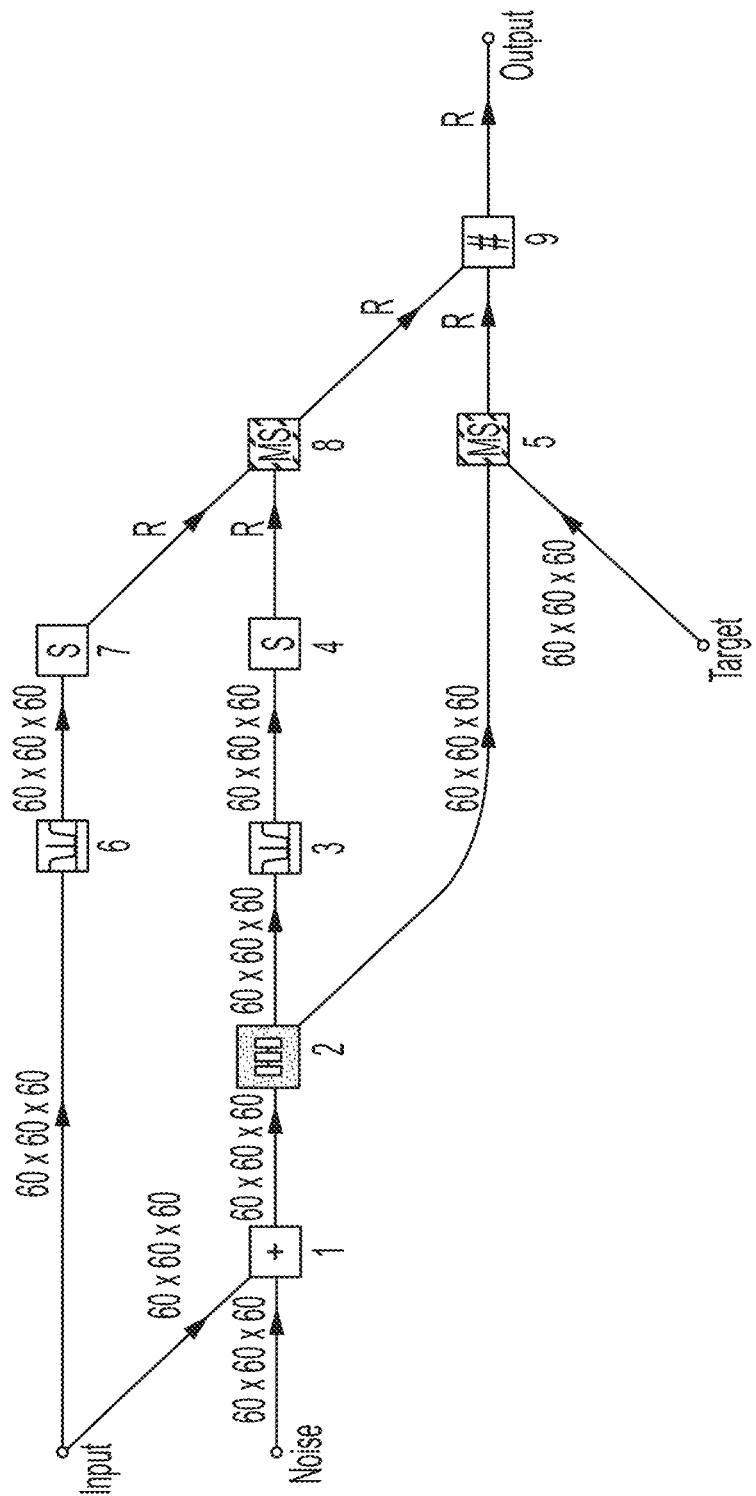
FIG. 6A shows the example of the network, which predicts the as-printed shape in accordance with embodiments described herein.

FIG. 6A shows the example of the network, which predicts the as-printed shape. The training set for the second neural network can be obtained experimentally or numerically. The experimental data collection involves printing many parts of the same geometry. Then the printed parts have to be scanned and digitized. The probability of the local material accumulation is estimated by counting for every voxel the number of times it is filled with the material, if the training data is collected from numerical simulations, only the last step is required since the numerical model output directly the digital representation of the shape. The numerical model does not have uncertainty unless it is explicitly specified. Modeling the uncertainty requires adding random numbers to the parameters of the model at every deposition event. The first neural network can be used to accelerate the numerical data collection for the second model.

Figure 6B:
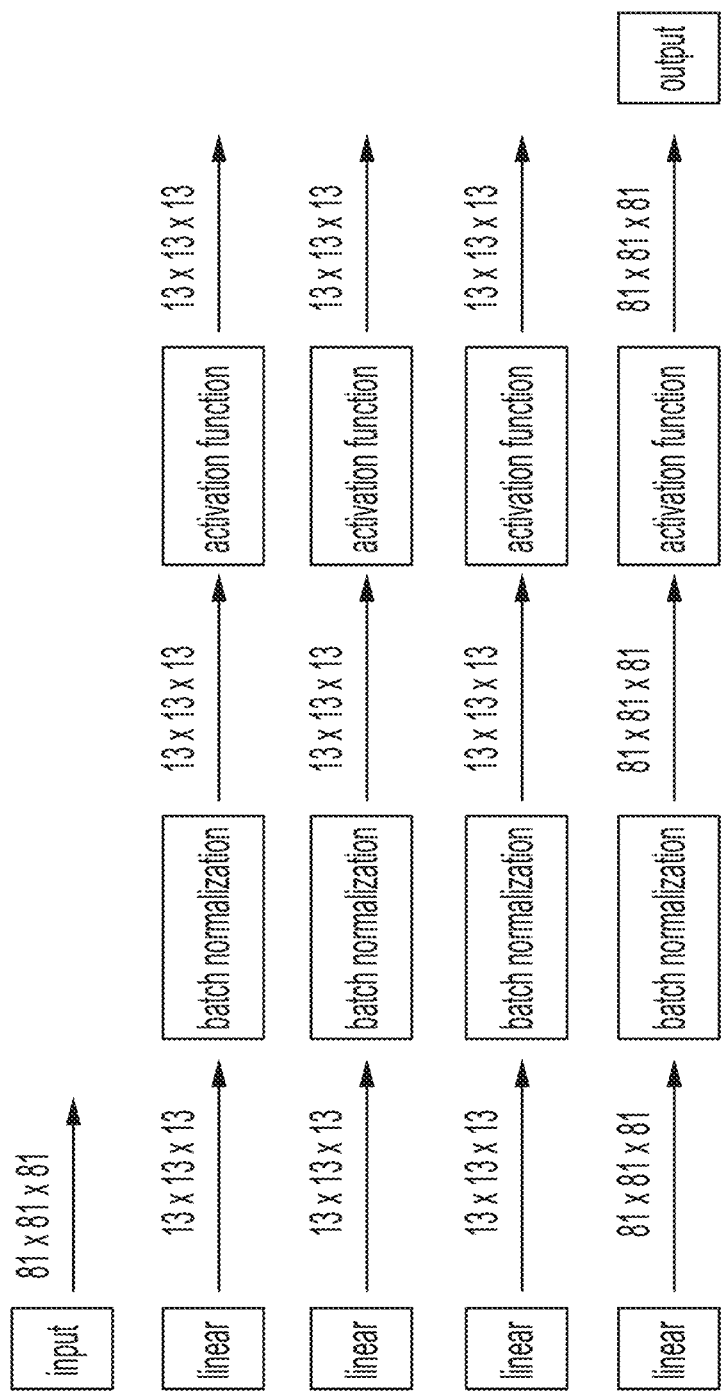
FIG. 6B shows a fully connected feed-forward neural network that is used to predict the state of the solidified droplet and the substrate in accordance with embodiments described herein.

FIG. 6B shows a fully connected feed-forward neural network that is used to predict the state of the solidified droplet and the substrate. The dimensions of the domain are reduced inside the network (to reduce the amount of required GPU memory). As shown in FIG. 6B, the neural network constituted of series of matrix multiplications followed by the non-linear transformation. In the machine learning nomenclature, the matrix multiplication is referred to as a linear layer, and the non-linear part is referred to as the activation function. The neural network should have at least one linear layer, followed by the activation function. Training of the neural network may involve inputting a large enough training set. Encoding physical constraints in the loss function and the activation function allows reducing the size of the training set. The loss function is minimized during the training process of the neural network. Physical constraints can be also encoded inside the activation function.

A custom activation function is used to ensure that $T_{min} < |\alpha_{i,j,k}| < T_{max}$, where $\alpha_{i,j,k}$ are the input/output of the layers. The activation function is defined as in (10).

$$f = \text{Clip}\left(\frac{1}{bx}(A+B), (0, 1)\right) \quad (10)$$

$$A = \text{Clip}(\text{Ramp}(x - T_{min}), (0, 1))$$

$$B = \text{Clip}(\text{Ramp}(-x - T_{min}), (0, 1))$$

Here, x is a variable with b as the parameter that defines the smoothness of transition. $T_{min}$ and $T_{max}$ are respectively the minimal and maximal temperature. The function Clip is defined as in (11).

$$\text{Clip}(x,(a,b))=a, x<a,$$

$$\text{Clip}(x,(a,b))=x, a<x<b,$$

$$\text{Clip}(x,(a,b))=b, x>b \quad (11)$$

The ramp function is defined as in (12).

$$\text{Ramp}(x)=x, x>0,$$

$$\text{Ramp}(x)=0, x\leq 0 \quad (12)$$

Figure 7:
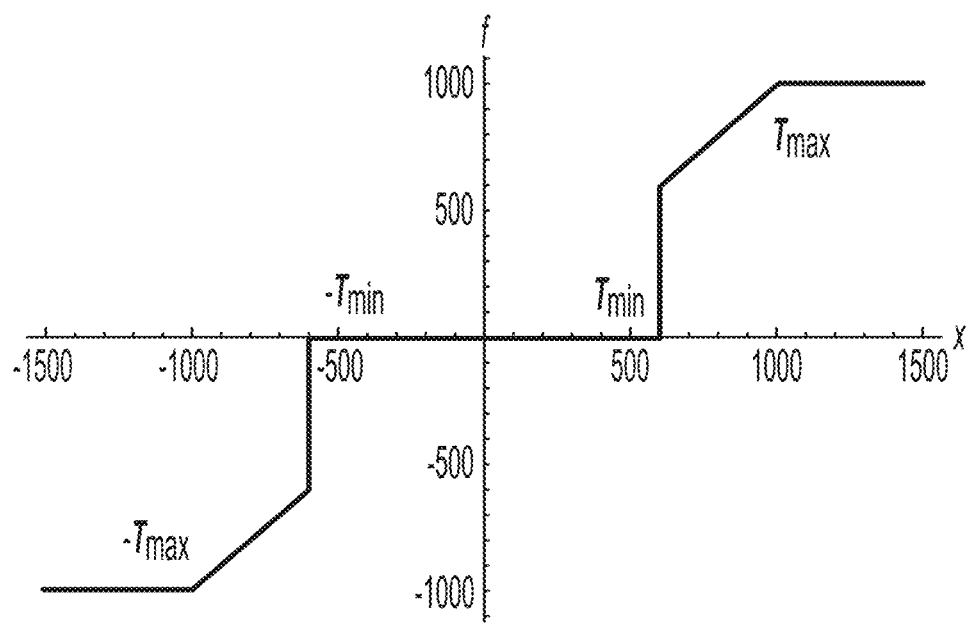
FIG. 7 shows the plot of the activation function in accordance with embodiments described herein.

FIG. 7 shows the plot of the activation function in accordance with embodiments described herein. The activation function is used in the neural network to enforce the upper and lower boundaries of the temperature field. For example, the temperature can not be negative and higher than some value.

The network is trained by minimizing the sum of two cost functions. The first cost function is the difference between the output of the network and the target value. The second term is the difference between the mass of the input and the output. The second constraint enforces the conservation of total mass since the total mass of the solid and liquid phases is preserved between input and output. The total mass is obtained using the following function shown in (13).

$$g = \frac{1}{2}\left(\text{Tanh}\left(\frac{x - T_{min}}{b}\right) - \text{Tanh}\left(\frac{x + T_{min}}{b}\right) + 2\right) \quad (13)$$

Figure 8:
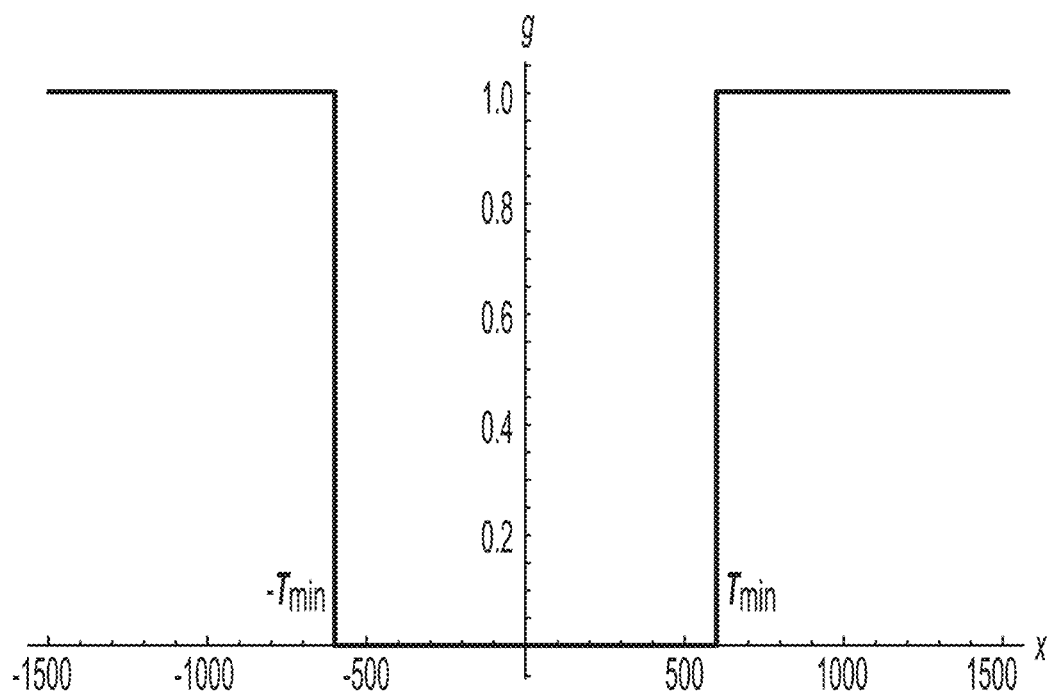
FIG. 8 shows the plot of the count function that counts the non-zero voxels in accordance with embodiments described herein.

Here, Tan h is the hyperbolic tangent and b is a parameter that defines the smoothness of the transition. FIG. 8 shows the plot of the count function.

Figure 9A:
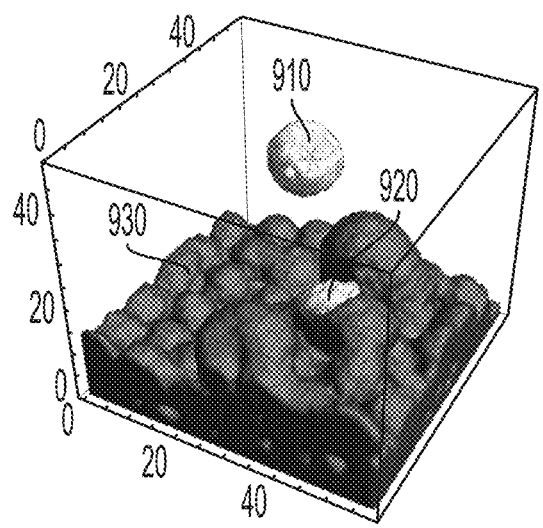
FIG. 9A illustrates an example neural network input in accordance with embodiments described herein.
Figure 9B:
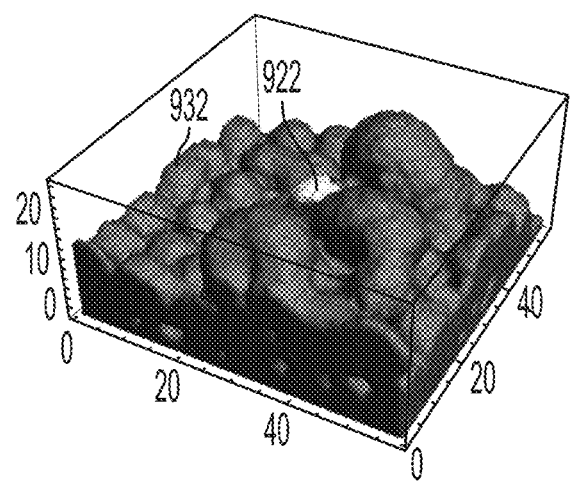
FIG. 9B shows a prediction of the neural network based on the input in accordance with embodiments described herein.
Figure 9C:
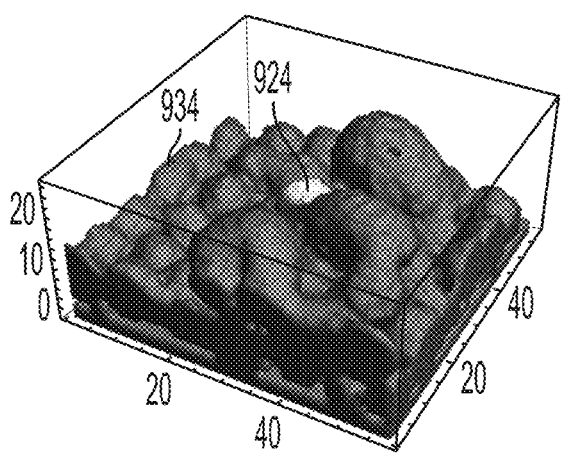
FIG. 9C illustrates the ground truth from the multiphysics solver in accordance with embodiments described herein.

FIGS. 9A-9C show an example input (FIG. 9A), prediction of the neural network (FIG. 9B), and ground truth from the multi-physics solver (FIG. 9C). In this example, the neural network was trained using $N_{set}=10000$ samples. The solid phase 930, 932, 934 and the liquid phase 910, 920, 922, 924 is shown. It can be observed that the surrogate model (FIG. 9B) generates highly similar output to the multi-physics solver (FIG. 9C) in about 0.1 s compared to about an hour to generate an individual droplet coalescence simulation using the multi-physics solver.

Figure 10A:
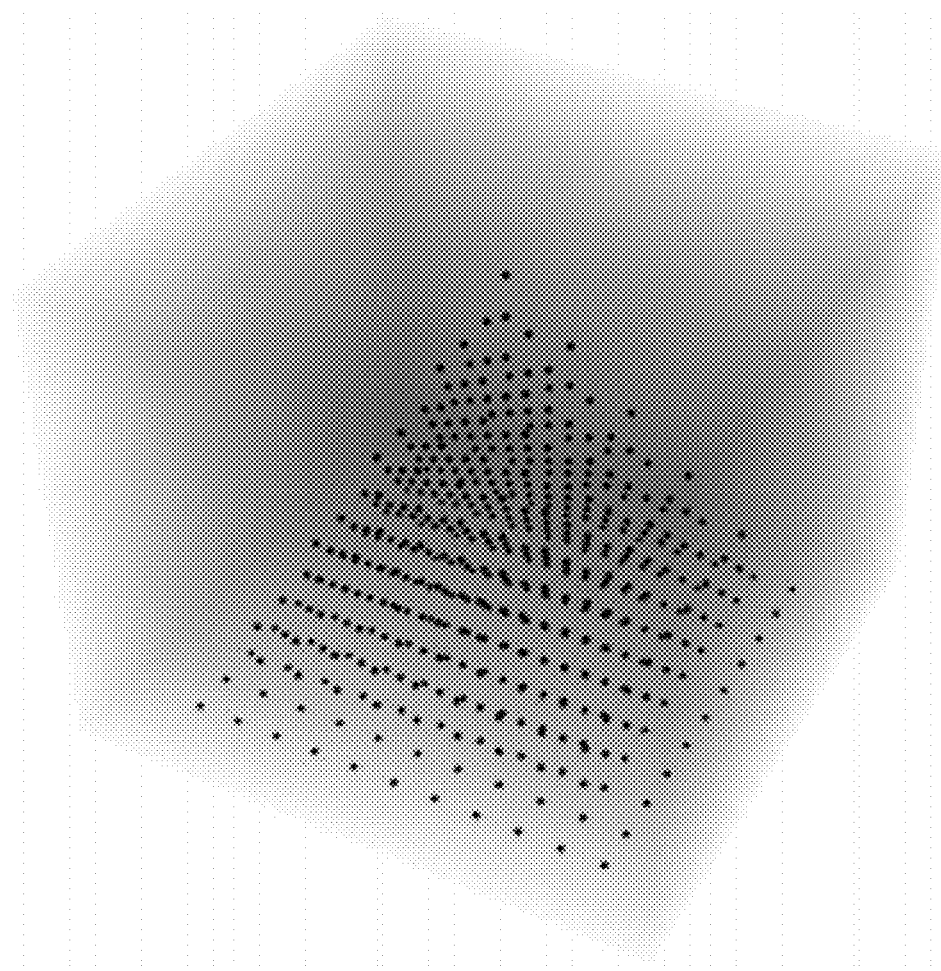
FIGS. 10A-10E show a schematic plot of the workflow in accordance with embodiments described herein.
Figure 10B:
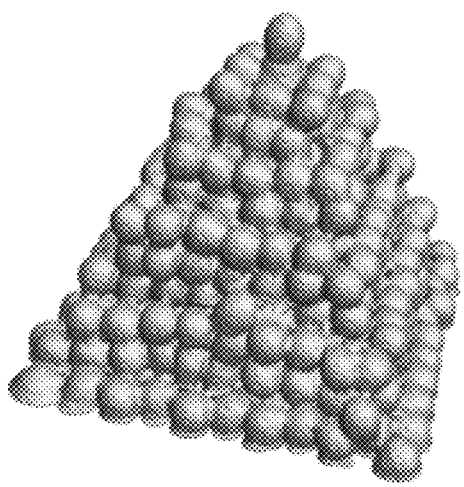
Figure 10C:
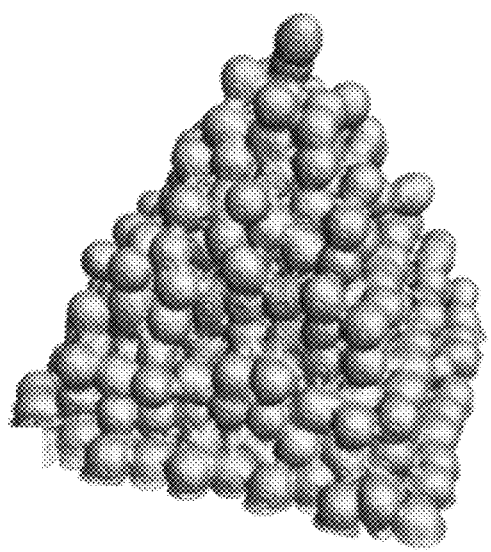
Figure 10D:
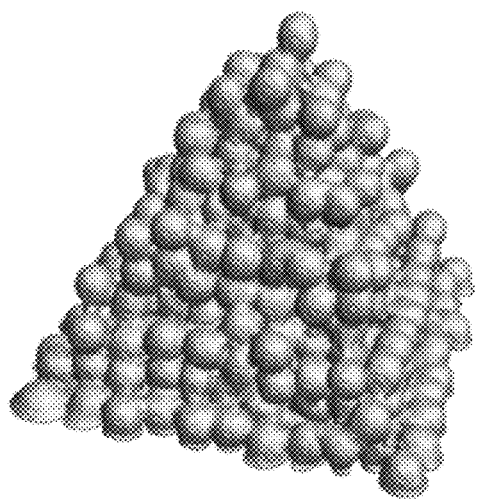
Figure 10E:
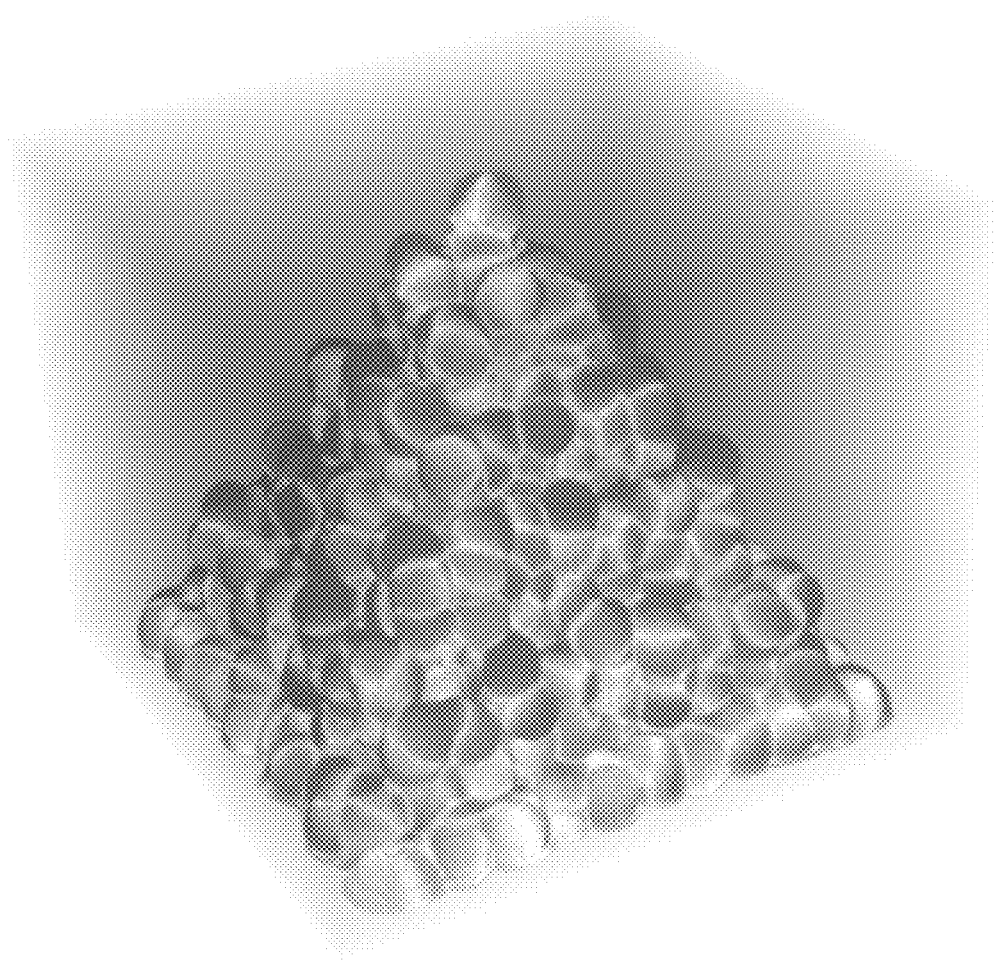

According to embodiments described herein, manufacturing uncertainty of a product part may be determined to predict the as-printed shape. The kernel can be found in (1) by training a Convolutional Neural Network (CNN) with a single convolution layer and zero bias. Other methods could include computing the convolution using the Fast Fourier Transform on Graphics Processing Units, for example. First, the surrogate model is used to generate a training set. The training set may include an array of pairs that maps the tool-path into the spatial distribution of probability, $D=\{\{T_1, P_1\}, 1=1, \ldots, N\}$. The voxelized tool-path $T=\{t_{ijk}, i=1, \ldots, N_i, k=1, \ldots, N_k\}$ is an array of binary numbers, $t_{ijk} \in \{0, 1\}$, and the array $P=\{p_{ijk}, i=1, \ldots, N_i, j=1, \ldots, N_j, k=1, \ldots, N_k\}$ represents the voxelized spatial distribution of local material accumulation probability, $p_{ijk} \in [0; 1]$, N is the number of data points in the set and $N_i$, $N_j$, $N_k$ are the arrays dimensions. To generate the set, the Monte-Carlo approach is used by modeling the build process of the same part multiple times while introducing uncertainty in the tool-path. Such a data set can be generated rapidly using the surrogate model for the multi-physics simulation. A schematic plot of the workflow is shown in FIGS. 10A-10E in accordance with embodiments described herein. FIG. 10A shows the tool path that defines the location of the droplet deposition. The tool-path is obtained by running a slicer on an STL model of the nominal design and obtaining the resulting G-code paths. As can be observed from FIG. 10A, the tool-path for a pyramid is shown. In the tool-path, the distance between the droplet depositions is fixed in XY plane and equal to about 350 µm in this example. Before simulating a realization of a part build, uncertainty is added to the tool-path. The uncertainty is modeled by adding a uniform random variable to at least one location of droplet deposition. In some cases, the uniform random variable is added to all locations of droplet deposition. According to various embodiments, the bounds for the random variable are in a range of about −58 µm to about 58 µm. An iteration is performed over the tool-path to model the build of a part. According to some examples, for every part, ten realizations are generated. It is to be understood that more of less realizations can be used. Three examples (FIG. 10B, FIG. 10C, and FIG. 10D) of the modeled as-printed geometry for the pyramid are generated. Given ten realizations, the probability of the local material accumulation is calculated by counting a number of times when a given voxel is filled with the solid phase. The resulting probability field is shown in FIG. 10E.

Figure 11:
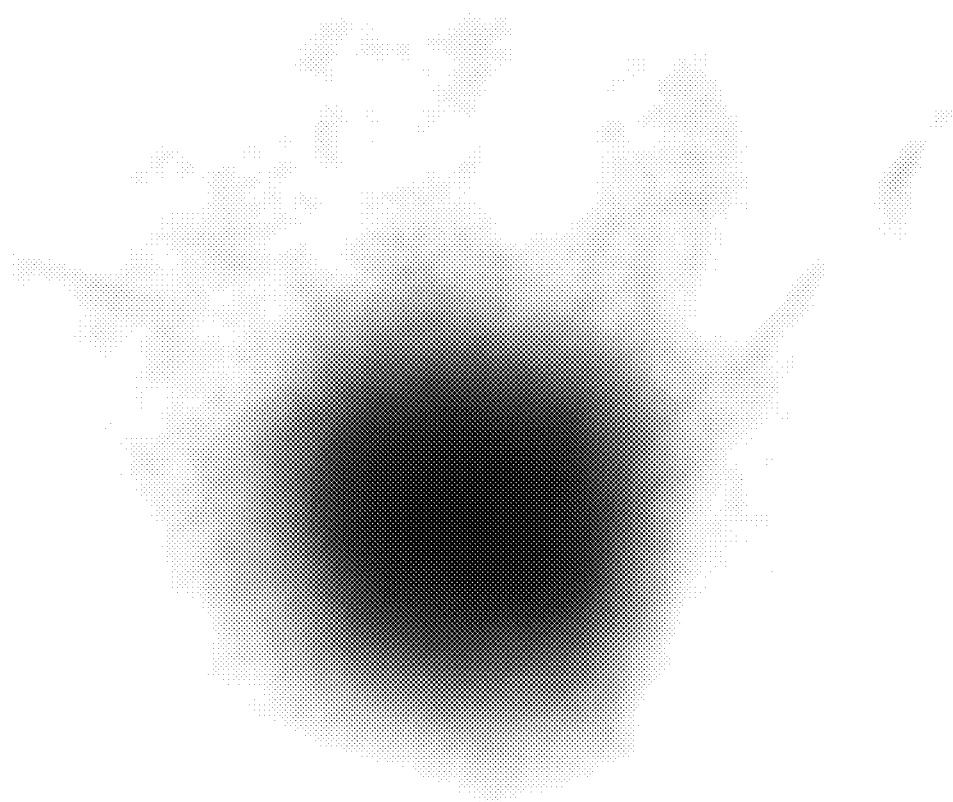
FIG. 11 illustrates the volumetric plot of the calculated kernel in accordance with embodiments described herein.
Figure 12:
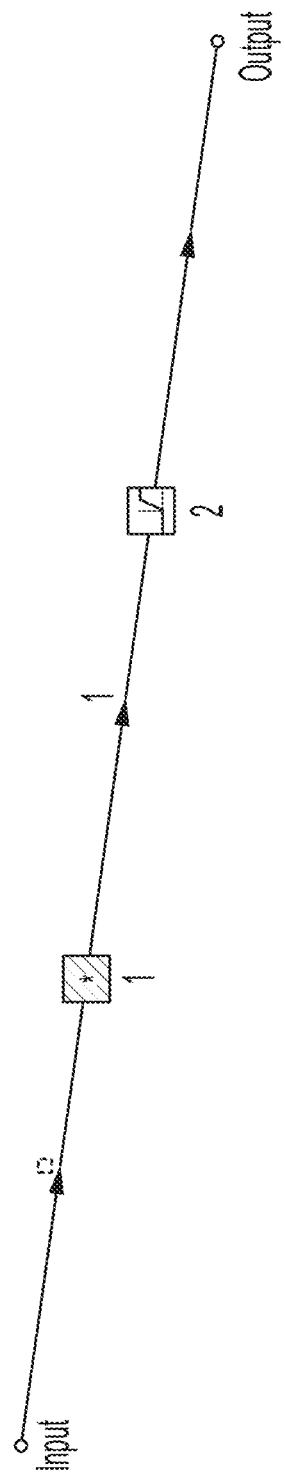
FIG. 12 shows the example of the network, which predicts the as-printed shape in accordance with embodiments described herein.
Figure 13A:
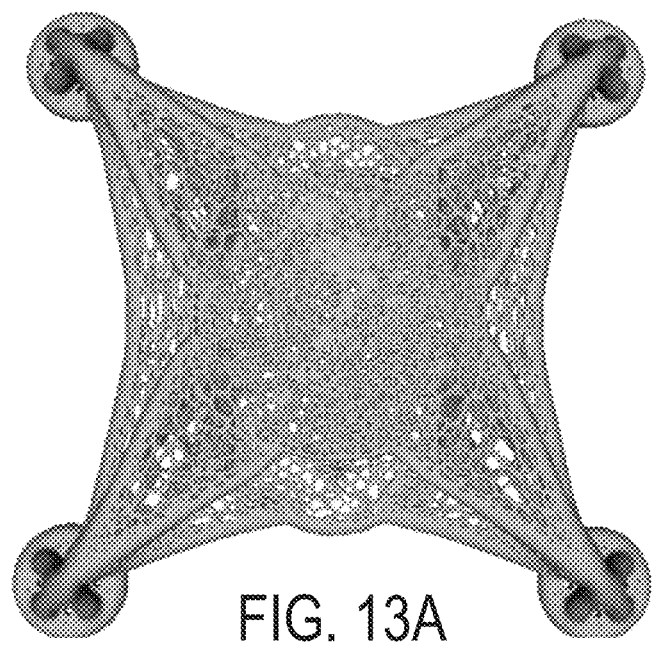
FIGS. 13A-14B show an example inputs and outputs for two different shapes in accordance with embodiments described herein.
Figure 13B:
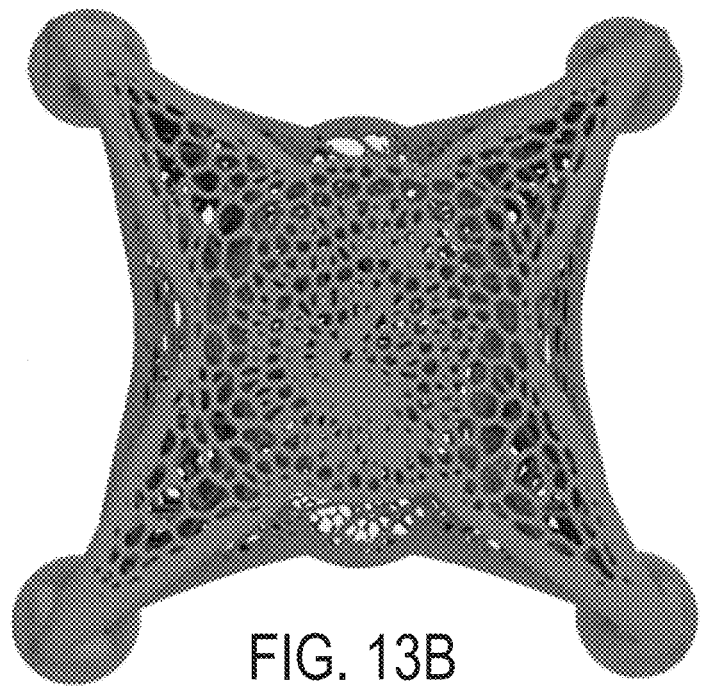
Figure 14A:
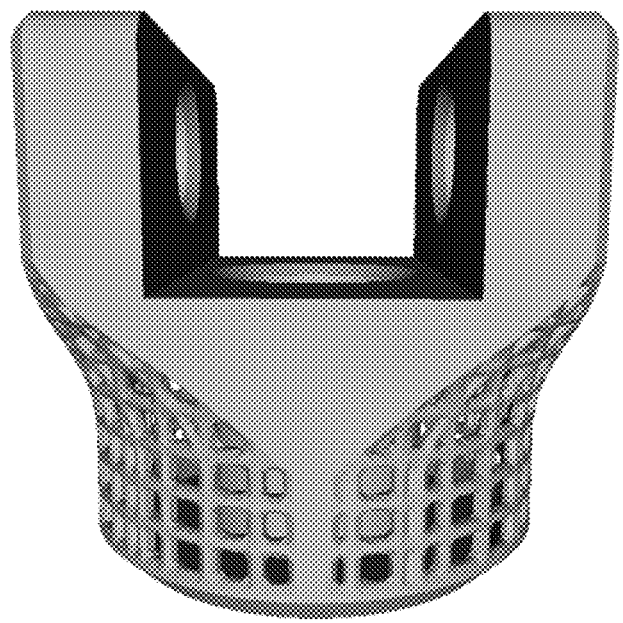
Figure 14B:
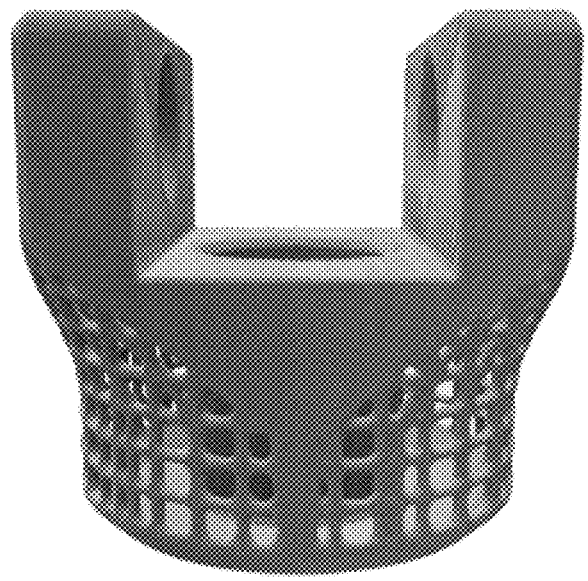

According to embodiments described herein, the CNN is trained using a set of 100 pairs of tool-paths and the corresponding probability field. The weight of the convolutional layer is extracted after training which provides the solution to the deconvolution problem to estimate the kernel K. The volumetric plot of the calculated kernel is shown in FIG. 11. Using this kernel, the as-manufactured probability field from can be determined by using (1). Then, taking an appropriate sub-level set of the field (P) for a chosen probability (p) would give an estimate of the as-manufactured shape (for that probability). FIG. 12 shows the example of the network, which predicts the as-printed shape in accordance with embodiments described herein. FIG. 13A shows an example input and FIG. 13B illustrates an example output for a first shape. Similarly, FIG. 14A shows an example input and FIG. 14B illustrates an example output for a second shape.

Figure 15:
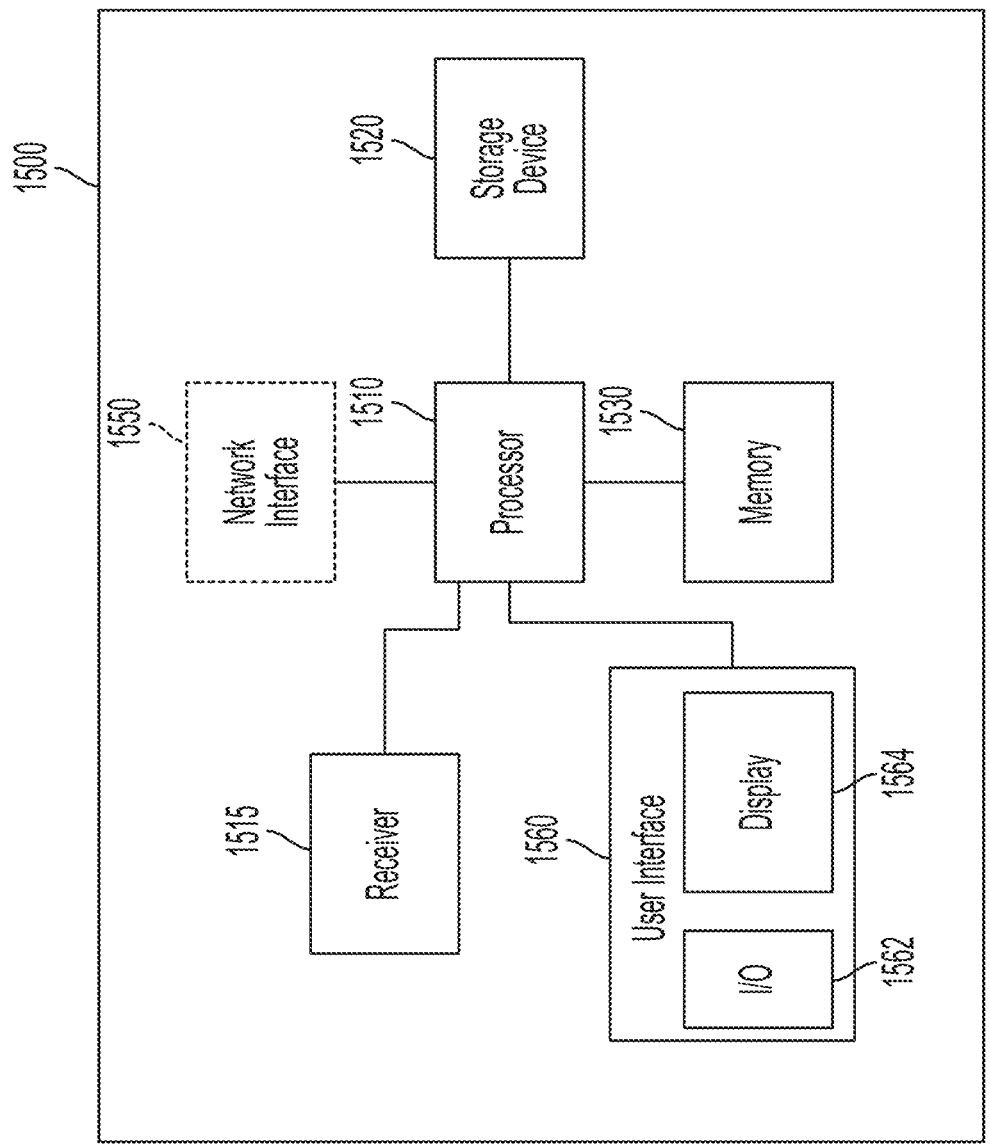
FIG. 15 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 15. Computer 1500 contains a processor 1510, which controls the overall operation of the computer 1500 by executing computer program instructions which define such operation. It is to be understood that the processor 1510 can include any type of device capable of executing instructions. For example, the processor 1510 may include one or more of a central processing unit (CPU), a graphical processing unit (GPU), a field-programmable gate array (FPGA), and an application-specific integrated circuit (ASIC). The computer program instructions may be stored in a storage device 1520 (e.g., magnetic disk) and loaded into memory 1530 when execution of the computer program instructions is desired. Thus, the steps of the methods described herein may be defined by the computer program instructions stored in the memory 1530 and controlled by the processor 1510 executing the computer program instructions. The computer 1500 may include one or more network interfaces 1550 for communicating with other devices via a network. The computer 1500 also includes a user interface 1560 that enables user interaction with the computer 1500. The user interface 1560 may include I/O devices 1562 (e.g., keyboard, mouse, speakers, buttons, etc.) to allow the user to interact with the computer. Such input/output devices 1562 may be used in conjunction with a set of computer programs in accordance with embodiments described herein. The user interface also includes a display 1564. According to various embodiments, FIG. 15 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate embodiments described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
receiving a computer representation of a printable product part and a plan for the printable product part to be deposited using an additive manufacturing process, the printable product part comprising an accumulation of material deposited by the additive manufacturing process, the plan comprising a process parameter and a representation of a tool-path used in building the printable product part;
determining a plurality of as-printed shapes of the printable product part after it has been deposited according to the plan, wherein determining the plurality of as-printed shapes comprises performing a plurality of physics informed simulations where uncertainty is introduced in the tool-path, wherein for each of the plurality of as printed shapes, the physics informed simulation comprises:
for each deposition event of the plan, inputting an initial state of a distribution of liquid and solid phases into a feedforward neural network with physics informed loss and activation functions, the feedforward neural network outputting a spatial distribution of a substrate after the deposition event; and
performing convolution of a kernel with the tool-path to obtain a spatial distribution of a solid phase of the as-printed shapes;
determining geometric differences between any of the plurality of as-printed shapes with the computer representation of the product part; and
using the geometric differences in the additive manufacturing process to build the printable product part with acceptable part quality.

2. The method of claim 1, wherein the additive manufacturing process comprises a plurality of liquid metal droplets that coalesce and solidify according to the plan.

3. The method of claim 1, further comprising determining a manufacturing error from the plurality of as-printed shapes of the product part based on a statistical analysis.

4. The method of claim 1, further comprising determining the plurality of as-printed shapes based on at least one physical state of one or both of at least one deposited material and a substrate.

5. The method of claim 4, wherein the at least one physical state comprises one or more of a spatial distribution of solid and liquid phases of the material, a spatial distribution of temperature, a pressure, and a flow velocity.

6. The method of claim 1, comprising generating training data for the feedforward neural network using one or more of synthetically generated data and experimental data.

7. The method of claim 1, comprising computing the difference between the computer representation of the product part and any or all of the as-printed shapes of the product part.

8. The method of claim 7, further comprising displaying the geometric differences on a user interface.

9. The method according to claim 1, wherein the kernel is estimated by training a convolutional neural network with a single convolutional layer.

10. A system, comprising:
a processor; and
a memory storing computer program instructions which when executed by the processor cause the processor to perform operations comprising:
receiving a computer representation of a printable product part and a plan for the printable product part to be deposited using an additive manufacturing process, the printable product part comprising an accumulation of material deposited by the additive manufacturing process, the plan comprising a process parameter and a representation of a tool-path used in building the printable product part;
determining a plurality of as-printed shapes of the printable product part after it has been deposited according to the plan, wherein determining the plurality of as-printed shapes comprises performing a plurality of physics informed simulations where uncertainty is introduced in the tool-path, wherein for each of the plurality of as printed shapes, the physics informed simulation comprises:
for each deposition event of the plan, inputting an initial state of a distribution of liquid and solid phases into a feedforward neural network with physics informed loss and activation functions, the feedforward neural network outputting a spatial distribution of a substrate after the deposition event; and
performing convolution of a kernel with the tool-path to obtain a spatial distribution of a solid phase of the as-printed shapes; and
determining geometric differences between any of the plurality of as-printed shapes with the computer representation of the product part, the geometric differences being used in the additive manufacturing process to build the printable product part with acceptable part quality.

11. The system of claim 10, wherein receiving the plan for the printable product part comprises receiving at least one of a multi-physics model and a machine learning model as a surrogate for the multi-physics model.

12. The system of claim 10, further comprising a user interface configured to display to geometric differences.

13. The system of claim 10, wherein the additive manufacturing process comprises a plurality of liquid metal droplets that coalesce and solidify according to the plan.

14. The system of claim 10, wherein the processor is further configured to determine a manufacturing error from the plurality of as-printed shapes of the product part based on a statistical analysis.

15. The system of claim 10, wherein the processor is further configured to determine the plurality of as-printed shapes based on at least one physical state of one or both of at least one deposited material and a substrate.

16. The system of claim 15, wherein the at least one physical state comprises one or more of a spatial distribution of solid and liquid phases of the material, a spatial distribution of temperature, a pressure, and a flow velocity.

17. The system of claim 15, wherein each of the plurality of as-printed shapes comprise a spatial distribution of a solid phase of the as-printed shapes.

18. A non-transitory computer readable medium storing computer program instructions, the computer program instructions when executed by a processor cause the processor to perform operations comprising:
receiving a computer representation of a printable product part and a plan for the printable product part to be deposited using an additive manufacturing process, the printable product part comprising an accumulation of material deposited by the additive manufacturing process, the plan comprising a process parameter and a representation of a tool-path used in building the printable product part;
determining a plurality of as-printed shapes of the printable product part after it has been deposited according to the plan, wherein determining the plurality of as-printed shapes comprises performing a plurality of physics informed simulations where uncertainty is introduced in the tool-path, wherein for each of the plurality of as printed shapes, the physics informed simulation comprises:
for each deposition event of the plan, inputting an initial state of a distribution of liquid and solid phases into a feedforward neural network with physics informed loss and activation functions, the feedforward neural network outputting a spatial distribution of a substrate after the deposition event; and
performing convolution of a kernel with the tool-path to obtain a spatial distribution of a solid phase of the as-printed shapes;
determining geometric differences between any of the plurality of as-printed shapes with the computer representation of the product part; and
using the geometric differences in the additive manufacturing process to build the printable product part with acceptable part quality.

* * * * *